United States Patent
Niccolini et al.

(10) Patent No.: US 8,458,456 B2
(45) Date of Patent: Jun. 4, 2013

(54) METHOD AND SYSTEM FOR VERIFYING THE IDENTITY OF A COMMUNICATION PARTNER

(75) Inventors: Saverio Niccolini, Heidelberg (DE); Jan Seedorf, Heidelberg (DE); Nico D'Heureuse, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 299 days.

(21) Appl. No.: 12/990,530

(22) PCT Filed: Apr. 30, 2008

(86) PCT No.: PCT/EP2008/003508
§ 371 (c)(1),
(2), (4) Date: Dec. 3, 2010

(87) PCT Pub. No.: WO2009/132668
PCT Pub. Date: Nov. 5, 2009

(65) Prior Publication Data
US 2011/0066849 A1 Mar. 17, 2011

(51) Int. Cl.
*H04L 9/32* (2006.01)

(52) U.S. Cl.
USPC .............. 713/156; 713/168; 713/169

(58) Field of Classification Search
None
See application file for complete search history.

(56) References Cited

U.S. PATENT DOCUMENTS

| 7,203,753 | B2* | 4/2007 | Yeager et al. | 709/225 |
|---|---|---|---|---|
| 2003/0055898 | A1* | 3/2003 | Yeager et al. | 709/205 |
| 2003/0188156 | A1 | 10/2003 | Yasala et al. | |
| 2006/0036862 | A1* | 2/2006 | Tuvell et al. | 713/171 |
| 2007/0299921 | A1 | 12/2007 | Brown et al. | |

OTHER PUBLICATIONS

International Search Report, dated Apr. 7, 2009, from corresponding PCT application.

* cited by examiner

*Primary Examiner* — Kaveh Abrishamkar
(74) *Attorney, Agent, or Firm* — Young & Thompson

(57) ABSTRACT

A method for verifying the identity of a communication partner, in particular in real-time communications, wherein a caller (A) sends a message towards a callee (B), and wherein the caller (A) attaches a self-signed certificate to the message, characterized in that the caller (A) and the callee (B) are part of a web-of-trust, wherein certificates of users within the web-of-trust are stored by one or more key-servers (3), wherein trust relationships between users within the web-of-trust are employed to compute a trust-chain between the caller (A) and the callee (B) based upon the certificate attached to the message and upon the callee's certificate, and wherein the further processing of the message received by the callee (B) is based on the length of the derived trust-chain. Furthermore, a corresponding system is described.

20 Claims, 2 Drawing Sheets

METHOD AND SYSTEM FOR VERIFYING THE IDENTITY OF A COMMUNICATION PARTNER

Figure 1:
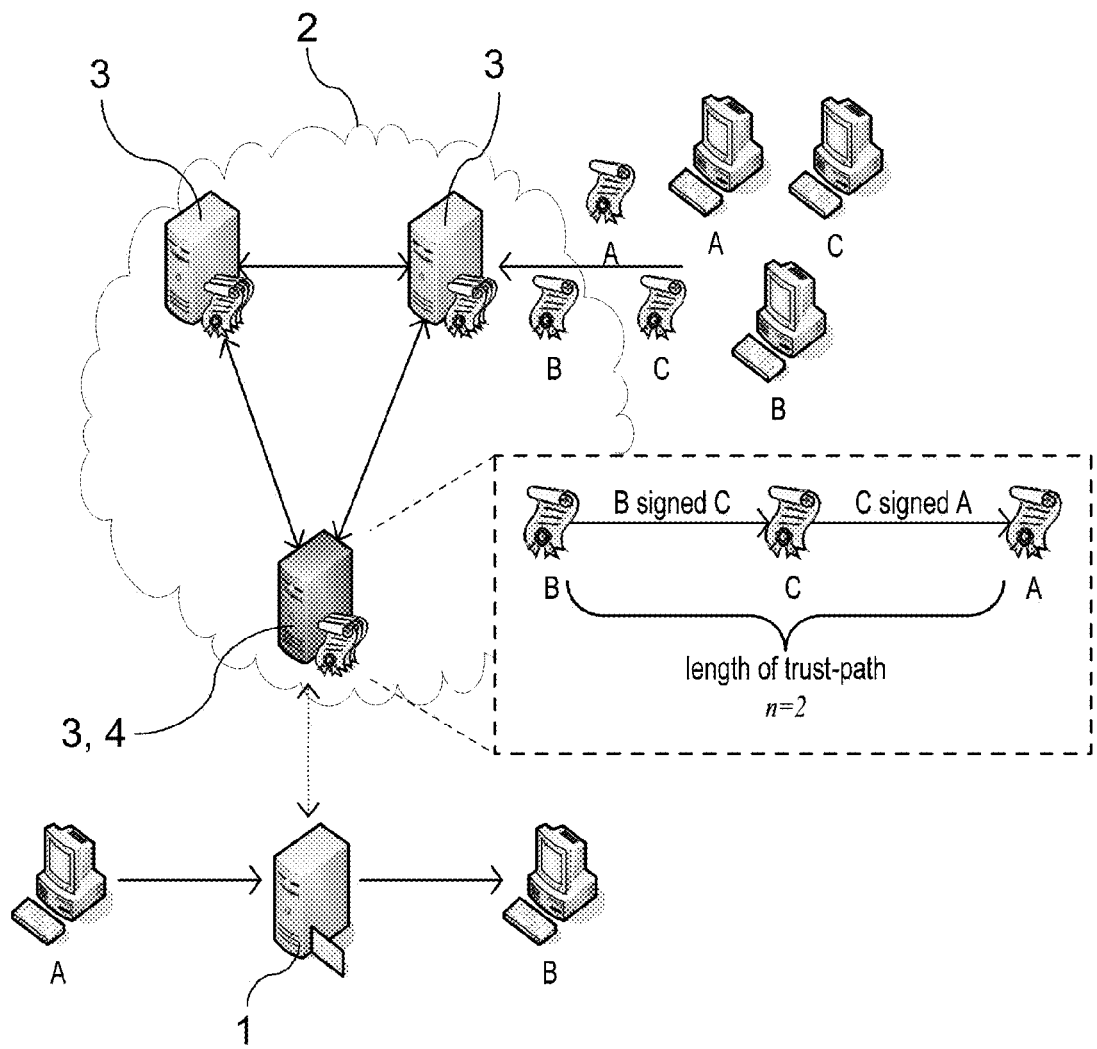

The present invention relates to a method and a system for verifying the identity of a communication partner, in particular in real-time communications, wherein a caller sends a message towards a callee, and wherein the caller attaches a self-signed certificate to said message.

Modern communication networks offer users the possibility to communicate with each other in many different ways. For instance, users can exchange e-mail messages or SMS (Short Message Service) among each other or can communicate via Instant Messaging (IM) with each other, to name just the most popular services for communication by means of text messages. In particular, real-time communication like e.g. VoIP (Voice over IP) has gained more and more importance over the last years. Although nowadays countless users take advantage of the manifold benefits of all these forms of communication, there are still some severe shortcomings involved. A special problem will be described in the following by way of example with VoIP, although it occurs likewise with other forms of communication.

VoIP protocols (e.g. SIP, Session Initiation Protocol) are vulnerable to many types of attacks. Examples are interruption of service attacks (i.e., Denial of Service, DoS) and social attacks (i.e., SPam over Internet Telephony, SPIT). In order to prevent these attacks it is necessary to estimate if an incoming message (e.g., SIP-Invite) is trustworthy or malicious. One core challenge is to verify that an incoming call has been initiated by the user belonging to the caller's identity in the SIP-message (i.e., the URI (Uniform Resource Identifier) in the From-Header). This problem is not easy to solve as VoIP-identities (e.g., the SIP-URI) can be spoofed. This makes the detection of social attacks like SPIT and unsolicited communications in general a sophisticated problem.

Many currently proposed mechanisms for estimating if an incoming message was sent by the user belonging to the caller-identity rely on so-called "strong identities": If an identity is signed by a centralised authority which is trusted by the receiving end, messages received from this identity are believed to be non-malicious. For SIP, the identity is the SIP-URI, and it has been proposed to have this identity signed by the domain of the caller. When the caller makes a call, the domain challenges the caller with an authentication request. Only after proper authentication the domain will sign the outgoing message. When receiving a call, the proxy of the callee verifies the signature with the public key of the caller's domain. This technique is described in RFC4474: Enhancements for Authenticated Identity Management in the Session Initiation Protocol (SIP), http://tools.ietf.org/html/rfc4474Draft SPIT.

However, the approach described above proves to be disadvantageous in several aspects: First of all, the approach requires the existence of a mechanism to exchange public keys between domains. In addition, a mechanism is necessary to verify the binding of a retrieved public key to the domain of the sender, and, finally, there is no trustworthiness regarding the user's behaviour associated with the assertion of the identity. The common practice to solve the first two problems is to use a Public Key Infrastructure (PKI). A hierarchy of Certificate Authorities (CAs) is used to establish a cryptographically verifiable trust chain between any two entities in the system. This implies that a central authority on top of this CA-hierarchy, the Root-CA, is trusted by all entities in the system. The Root-CA is the basic building block for all trust related to assertions of identities in such a system.

It is therefore an object of the present invention to improve and further develop a method and a system of the initially described type for verifying the identity of a communication partner in such a way that the above mentioned problems are widely avoided and that a rating of trustworthiness of a message is possible.

In accordance with the invention the aforementioned object is accomplished by a method comprising the features of claim 1. According to this claim, such a method is characterized in that the caller and the callee are part of a web-of-trust, wherein certificates of users within said web-of-trust are stored by one or more key-servers, wherein trust relationships between users within said web-of-trust are employed to compute a trust-chain between the caller and the callee based upon the certificate attached to said message and upon the callee's certificate, and wherein the further processing of said message received by the callee is based on the length of the derived trust-chain.

Furthermore, the aforementioned object is accomplished by a system comprising the features of independent claim 17. According to this claim, such a system is characterised in that it comprises a web-of-trust the caller and the callee are part of, one or more key-servers for storing certificates of users within said web-of-trust, an entity employing trust relationships between users within said web-of-trust to compute a trust-chain between the caller and the callee based upon the certificate attached to said message and upon the callee's certificate, and a message processing element which is configured to perform further processing of said message received by the callee based on the length of the derived trus-chain.

According to the invention it has first been recognised that existing mechanisms for estimating if an incoming message was sent by the user belonging to the caller identity are rather complex due to the requirement of a hierarchical structure of Certificate Authorities. In contrast to the centralized approach of employing a PKI, the present invention pursues a decentralized approach using a web-of-trust for verification of signed identities instead of a PKI. Certificates of users within said web-of-trust are stored by one or more key-servers. Trust relationships between users within the web-of-trust are employed to compute a trust-chain between the caller and the callee who are also part of the web-of-trust. A trust-chain between two identities A and B is a transitive certificate chain where A signed the certificate from a identity ID1, which in turn signed the certificate from an identity ID2, . . . , IDn, which signed the certificate of identity B.

To verify that the message was really sent by the user belonging to the identity inherent in the message, the callee invokes an algorithm to compute said trust-chain between the caller and the callee. The input to this algorithm is the certificate attached to the received message as well as the certificate of the callee. Depending on the length of the derived trust-chain between caller and callee, the further processing of the message can be decided on.

A main advantage of the present invention is that in a web-of-trust, end-users assert not only the binding between a user and a public key but also the trustworthiness of the asserted identity (as perceived in previous interactions). In contrast, a PKI usually signs identities based on technical authentication (e.g., the user [or SIP user agent] technically solves an authentication request). On the other hand, instead of solely relying on technical authentication, according to the invention the actual behaviour of identities (as viewed by other users) and potentially real-life trustworthiness are relied upon. To detect unsolicited communications, the usage of a web-of-trust is advantageous because it associates trust with a technical assertion. Moreover, trust relies on no central authority as in a PKI-based solution; in a web-of-trust trust is decentralized. A web-of-trust takes advantage of the social relationships between users. This may be a key building block to fight unsolicited communications like SPIT.

It is to be noted that the phrases "communication partner", "caller" and "callee" are to be understood in a broad sense and are not limited to specific forms of communication. Besides VoIP applications, e.g. based upon SIP, in which the present invention proves to be particularly advantageous, the present invention may be applied likewise in e.g. e-mail communication or instant messaging applications. In the latter cases the caller would correspond to the originator of the message and the callee would correspond to the recipient of the message.

Furthermore, it has to be noted that although the method and the system according to the present invention do not require a hierarchical structure with a central authority on top of the hierarchy, an application in a PKI setting with a CA-hierarchy is also possible. In this context, a Certificate Authority in a CA-hierarchy could perform a priori verification of certificates issued within the CA-hierarchy. This would significantly speed up the verification process because the signature of the caller's outgoing proxy could be verified prior to the actual call.

According to a specific embodiment it is provided that the caller signs the message with its private key and appends a self-signed certificate containing the corresponding public key. Signing the message with its private key could be performed as in a PKI-based approached by computing a hash over some particular headers (e.g. including the From header field and possibly the body of the message) and signing the resulting hash value. The appending of a self-signed certificate may be performed via S/MIME (Secure/Multipurpose Internet Mail Extensions).

Advantageously, it is provided that users upload certificates which have been signed by other users to the one or more key-servers. The more users participate by uploading certificates, the more effective is the system in computing (short) trust-chains between the caller and the callee.

According to a specific embodiment the trust relationships between users in the web-of-trust are derived at the time of a call in real-time or at least approximately in real-time. Based on the derived trust relationships between users the trust-chain between the caller and the callee can be calculated without affecting the call even in case of real-time communications.

However, in particular with respect to a cryptographic verification of a trust-chain it proves to be advantageous to have trust relationships between users already known prior to the call. To this end, it may be provided that the one or more key-servers include a specialized key-server which verifies the signature in each certificate it receives either from a user or from another server. By pre-processing the trust-relationships including cryptographic verification, a rating of the trustworthiness can be done in real-time.

The specialized key-server may be configured to periodically compute a file which contains the trust relationships between all certificates verified by the specialised key-server. The specialized key-server can use this file to offer the service of computing a trust-chain between two identities. Alternatively or additionally, the specialized key-server may be configured as to periodically publish the file containing the trust relationships. In this case other entities or devices can take advantage of the file and can compute a trust-chain themselves. As regards both the period of computing the file and publishing the file, a dynamic adaptation to the rate with which a specialized key-server receives certificates may be provided. By this means it is possible to have the trust relationships used for identifying if a call is trustworthy or not always as updated as possible. However, the deployment of periods with a preset length is also possible.

Within the file the trust relationships between the verified certificates may be contained in a compressed and machine-readable format which may furthermore facilitate the real-time computation of a trust-chain between two identities. Specifically, the known .wot-file format may be employed. This file format for storing trust path in a compressed way is already used and created by conventional PGP (Pretty Good Privacy)-key-servers. However, in a PGP-like web-of-trust the key-servers are not trusted and any user can store any certificate on the key-servers. Specifically, conventional PGP-key-servers do not verify the signatures of the certificates before creating a trust path file. This task is left to the users.

As regards further processing of the message received by the callee based on the length of the derived trust-chain the definition of thresholds is beneficial. The thresholds may be defined by the callee itself or by an additional message processing element which may be, for instance, the callee's proxy server. In particular, the definition of three thresholds may be provided. If the length of the derived trust-chain is below a predefined first threshold it may be provided that the message is accepted. In case of a real (telephone or VoIP) call this means that the call with the caller will be established. The message may be rejected (i.e. a call with the caller will not be established) if the length of the derived trust chain exceeds a predefined second threshold. Finally, a third threshold may be defined. If the length of the derived trust-chain exceeds that third threshold, forwarding of the message to a dedicated service may be provided. The service may invoke further steps to check the trustworthiness of the message.

To address scalability issues in a real system with a possible large number of users, it may be provided to deploy filtering mechanisms to confine the amount of pre-verified certificates. For instance, confinement of certificates could be based on domains. Alternatively or additionally, scalability issues may be addressed by distributing the pre-verification process among several specialized key-servers.

There are several ways how to design and further develop the teaching of the present invention in an advantageous way. To this end, it is to be referred to the patent claim subordinate to patent claims 1 and 17 on the one hand, and to the following explanation of a preferred example of an embodiment of the invention illustrated by the drawing on the other hand. In connection with the explanation of the preferred example of an embodiment of the invention by the aid of the drawing, generally preferred embodiments and further developments of the teaching will be explained. In the drawings FIG. 1 is a schematic view of a specific application scenario of an embodiment of the method according to the invention, and FIG. 2 illustrates the message flow according to an embodiment of the present invention.

Figure 2:
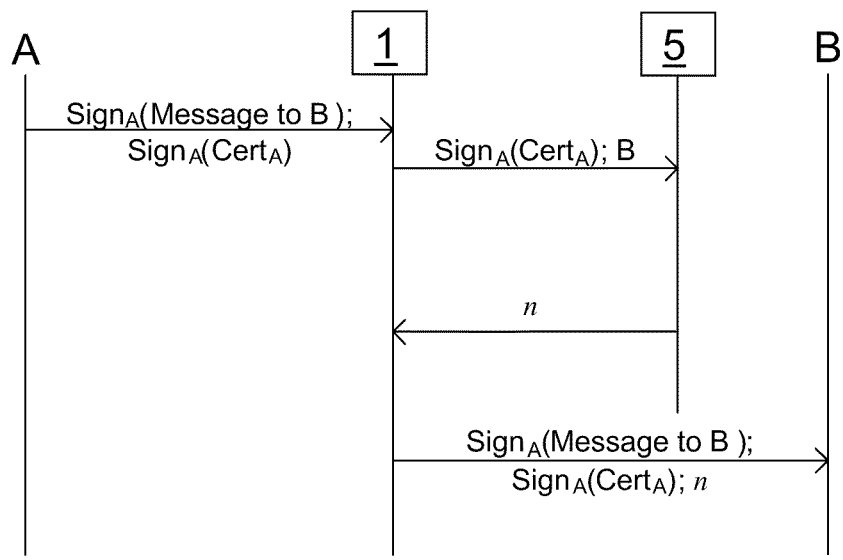

FIG. 1 shows the general architecture of a specific application scenario of an embodiment of the method according to the invention. User A—caller—sends a message for call establishment, e.g. a SIP INVITE message towards user B, which functions as callee. The message from user A is forwarded to user B by means of a message relay or proxy 1. Before establishing the call by sending a response to the SIP INVITE message back to user A, user B wants to make sure that the call does not constitute an unsolicited call and that the incoming call has really been initiated by the user belonging to the caller's identity, in this case the URI of user A in the From-Header of the SIP INVITE message.

The architecture used to verify the identity of caller A includes a key-server network 2 which comprises a multitude of preferably redundant key-servers 3, three of which are exemplarily shown. The key-servers 3 store keys and/or certificates of users. Specifically, users upload certificates to the key-servers 3 which have been signed by other users. The key-servers 3 update each other's key-databases using a dedicated communication protocol amongst them.

In a conventional PGP-like web-of-trust key-servers are not trusted and any user can store any certificate on the key-servers. Specifically, the signatures of the certificates are not verified by the key-servers. This task is left to the users. In contrast, according to the embodiment shown in FIG. 1, a specialized key-server 4 (the lower key-server in FIG. 1) as part of the key-server federation 2 is provided which operates normally in the federation 2 but additionally does the following:

For each certificate the specialized key-server 4 receives either from a user or from another server it verifies the signatures in the certificate. The server can do this because as a key-server it is in possession of the corresponding public keys to the private keys which signed the certificate. Furthermore, the specialized key-server 4 periodically computes a trust-relationship file which contains the trust relationships between all verified certificates by the server. Using this file, it can offer the service of computing a trust-chain between two identities. Consequently, computation and cryptographic verification of a trust-chain in real-time is achieved.

It is to be noted that according to an alternative embodiment it is also possible that the trust-relationship file is periodically published by the specialized key-server 4 to be used by others. In the example illustrated in FIG. 1, however, the message relay or proxy 1 which receives a message from A to B uses the services offered by the specialized key-server 4 to find out the trust-chain length between A and B. To this end, the callee B computes a key-ID, e.g. by hashing the public key, which is forwarded to the proxy 1 along with the key-ID of the caller A. Based on this information, the proxy 1 contacts the specialized key-server 4. In the example, the specialized key-server 4 detects that A trusts an identity C which in turn trusts an identity B. Since all signatures in the corresponding certificates of A, B, and C have been verified by the specialized key-server 4 a priori, the trust-chain is not only computed but verified as well. This is important because computing the trust-chain between A and B can be done in real-time but the corresponding verification is not feasible in real-time. Thus, it has to be done a priori by the server.

FIG. 2 illustrates the message flow between user A acting as caller and user B acting as callee according to an embodiment of the present invention. In the example, a proxy server 1 (e.g., a SIP proxy) uses an external service 5. The external service 5 may be a special web-of-trust key-server as the specialized key-server described in connection with FIG. 1, or, alternatively, an independent service which periodically fetches web-of-trust information from a specialized key-server as described above. It is also possible that the proxy server 1 does the computation of a trust-chain itself. In that case, the proxy server 1 and the service 5 are located in the same device/entity.

In the message flow according to the embodiment shown in FIG. 2, the proxy server 1 receives a message signed by user A with destination to user B. To find out if this message is trustworthy, the proxy server 1 forwards A's self-signed certificate and B's identity (e.g., as present in the To-header in case of a SIP message) to the service 5. The service 5 returns to the proxy server 1 the length of the trust-chain between A and B in the web-of-trust if such a chain exists or an error message if such a chain does not exist. The proxy server 1 then forwards the signed message to B, including the length of the derived trust-chain. B can now make a local decision on how to process the message depending on the length of the trust-chain. It is to be noted that, although not explicitly shown in FIG. 2, it is also possible that the proxy server 1 (instead of user B) takes different actions depending on the length of the trust-chain. In particular, it may be provided that user B can set customized configurations on proxy server 1 by means of which the processing of calls by proxy server 1 are specified according to user B's needs.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for verifying the identity of a communication partner in real-time, wherein a caller (A) sends a message towards a callee (B), and wherein the caller (A) attaches a self-signed certificate to said message, the method comprising:
storing, by one of more key-servers, certificates of users within a web-of-trust, wherein the caller (A) and the callee (B) are part of said web-of-trust, wherein the users upload the certificates which have been signed by other users to said one or more key-servers (3), wherein said one or more key-servers (3) include a specialized key-server (4) which verifies the signature in each said certificate it receives;
employing trust relationships between users within said web-of-trust to compute a trust-chain between the caller (A) and the callee (B) based upon the certificate attached to said message and upon the callee's certificate;
basing further processing of said message received by the callee (B) on the length of the derived trust-chain; and
said specialized key-server (4) periodically computing a file which contains the trust relationships among all the certificates verified by said specialized key-server.

2. Method according to claim 1, wherein the caller (A) signs said message with its private key and appends the self-signed certificate containing a corresponding public key to said message.

3. Method according to claim 1, wherein the trust relationships between users in said web-of-trust are derived at the time of the call in real-time or at least approximately in real-time.

4. Method according to claim 1, wherein said file is periodically published by said specialized key-server (4).

5. Method according to claim 1, wherein the periods of computing and/or publishing said file are dynamically adapted to the rate with which said specialized key-server (4) receives certificates.

6. Method according to claim 1, wherein the trust relationships between verified certificates are contained in said file in a compressed, machine-readable format.

7. Method according to claim 1, wherein the callee (B) accepts said message if the length of the derived trust-chain is below a predefined first threshold.

8. Method according to claim 1, wherein the callee (B) rejects said message if the length of the derived trust-chain exceeds a predefined second threshold.

9. Method according to claim 1, wherein the callee (B) invokes further steps to check the trustworthiness of said message if the length of the derived trust-chain exceeds a predefined third threshold.

10. Method according to claim 1, wherein the employed web-of-trust is a PGP (Pretty Good Privacy) web-of-trust.

11. Method according to claim 1, wherein filtering is deployed to confine the amount of pre-verified certificates.

12. Method according to claim 11, wherein the confinement of pre-verified certificates is based on domains.

13. Method according to claim 1, wherein the pre-verification process is distributed among several specialized key-servers (4).

14. A system for verifying the identity of a communication partner in real-time, wherein a caller (A) sends a message towards a callee (B), and wherein the caller (A) attaches a self-signed certificate to said message, the system comprising:
 a web-of-trust of which the caller (A) and the callee (B) are part,
 one or more key-servers (3) for storing certificates of users within said web-of-trust, said one or more key-servers (3) including a specialized key server (4) which is configured to verify signatures in each said certificate it receives and to periodically compute a file containing the trust relationships among all the certificates it stores,
 an entity employing trust relationships between users within said web-of-trust to compute a trust-chain between the caller (A) and the callee (B) based upon the certificate attached to said message and upon the callee's certificate, and
 a message processing element which is configured to perform further processing of said message received by the callee (B) based on the length of the derived trust-chain.

15. System according to claim 14, wherein said one or more key-servers (3) constitute a key-server federation (2).

16. System according to claim 15, wherein the key-servers (3) of said key-server federation (2) are configured to update each other's key-database.

17. System according to claim 14, wherein said message processing element is configured to accept said message if the length of the derived trust-chain is below a predefined first threshold.

18. System according to claim 14, wherein said message processing element is configured to reject said message if the length of the derived trust-chain exceeds a predefined second threshold.

19. System according to claim 14, wherein said message processing element is configured to forward said message to a dedicated service for invoking further steps to check the trustworthiness of said message if the length of the derived trust-chain exceeds a predefined third threshold.

20. System according to claim 14, wherein said specialized key-server is adapted to periodically publish the file.

* * * * *

UNITED STATES PATENT AND TRADEMARK OFFICE
CERTIFICATE OF CORRECTION

PATENT NO.       : 8,458,456 B2
APPLICATION NO.  : 12/990530
DATED            : June 4, 2013
INVENTOR(S)      : Niccolini et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 332 days.

Signed and Sealed this

Eighth Day of September, 2015

Michelle K. Lee
*Director of the United States Patent and Trademark Office*